United States Patent
Schnelle et al.

(10) Patent No.: US 11,497,345 B2
(45) Date of Patent: Nov. 15, 2022

(54) HOT DRINKS MAKER WITH CONTROL DEVICE

(71) Applicant: Miele & Cie. KG, Gütersloh (DE)

(72) Inventors: Axel Schnelle, Paderborn (DE); Marlene Paletta, Bielefeld (DE)

(73) Assignee: MIELE & CIE. KG, Gütersloh (DE)

( * ) Notice: Subject to any disclaimer, the term of this patent is extended or adjusted under 35 U.S.C. 154(b) by 504 days.

(21) Appl. No.: 16/576,808

(22) Filed: Sep. 20, 2019

(65) Prior Publication Data
US 2020/0093321 A1 Mar. 26, 2020

(30) Foreign Application Priority Data
Sep. 24, 2018 (DE) .................... 10 2018 123 364.7

(51) Int. Cl.
  *A47J 31/52* (2006.01)
  *A47J 31/46* (2006.01)
  *A23F 5/26* (2006.01)
  *A47J 31/42* (2006.01)
  *A47J 31/54* (2006.01)

(52) U.S. Cl.
  CPC ............ *A47J 31/5255* (2018.08); *A23F 5/26* (2013.01); *A47J 31/42* (2013.01); *A47J 31/468* (2018.08); *A47J 31/521* (2018.08); *A47J 31/54* (2013.01); *A47J 31/545* (2013.01)

(58) Field of Classification Search
  CPC .... A47J 31/5255; A47J 31/542; A47J 31/545; A47J 31/469; A47J 31/468
  See application file for complete search history.

(56) References Cited

U.S. PATENT DOCUMENTS

| | | | | |
|---|---|---|---|---|
| 10,687,652 | B1* | 6/2020 | Kwiatkowski | A47J 31/52 |
| 2005/0183578 | A1* | 8/2005 | Mandralis | A47J 31/36 |
| | | | | 99/279 |
| 2014/0242226 | A1* | 8/2014 | Buttiker | A47J 31/52 |
| | | | | 426/433 |
| 2020/0275798 | A1* | 9/2020 | Te Velde | A47J 31/52 |
| 2021/0212502 | A1* | 7/2021 | Ceotto | A47J 31/002 |

FOREIGN PATENT DOCUMENTS

WO 2017050968 A1 3/2017

* cited by examiner

*Primary Examiner* — Reginald Alexander
(74) *Attorney, Agent, or Firm* — Dickinson Wright PLLC

(57) ABSTRACT

A device for preparing hot beverages (1) has a flow control system (2) with a water source; (14) a brewing unit (40) with a brewing chamber (41) to hold brewing material and an with inlet line (L4) for the inlet of brewing water into the brewing chamber (41); a heating device (9) for heating the water supplied to the brewing chamber (41); a pump (9) configured to pump the water from the water source (14) to the brewing chamber (41); and a control device (18) to activate and deactivate the functional components for preparing of a selected beverage. In order to obtain an optimum brewing result, the control device (18) is configured to activate the pump (9) at a preselected rate of flow from a selection of different rates of flow (V̇) for a subsequent beverage preparation.

11 Claims, 4 Drawing Sheets

HOT DRINKS MAKER WITH CONTROL DEVICE

TECHNICAL FIELD

The invention relates to a device for preparing hot beverages, with a flow control system comprising the following functional components: a water source; a brewing unit having a brewing chamber to receive brewing material and an inlet line for the inlet of brewing water into the brewing chamber; a heating device for heating the water supplied to the brewing chamber; a pump for pumping the water from the source to the brewing chamber; and a control device to activate and deactivate the functional components for preparing of a selected beverage.

BACKGROUND

A coffee maker of this kind is known from WO 2017/050968 A1. The known coffee maker belongs to that class of coffee makers capable of preparing and dispensing at least two different types of coffee beverage; in particular these are coffee beverages of the filter coffee type and coffee beverages of the espresso type. In addition to the advantageous use of different types of coffee beans, the two coffee beverages differ by their differing brewing pressures. Furthermore, the pump is adjustable with different rates of flow dependent on the brewing pressure. In one brewing process, the procedure begins at a first rate of flow, and based on the detected pressure in the line, a second rate of flow is set. However, in this case it may happen here that the first adjusted rate of flow—which ultimately is used as the first set-quantity—is not optimum for the powder to be brewed. Furthermore, not all properties of the powder are yet sufficiently taken into account here, in order to obtain an optimum brewing result.

SUMMARY

Thus, the object of the invention is to further develop a device for preparing hot beverages to the effect that a plurality of different brewed beverages can be optimally prepared. The brewing result overall is to be improved.

According to the invention, this object is achieved inter alia by a device for preparing hot beverages with a flow control system, comprising a water source; a brewing unit including a brewing chamber to hold brewing material and an inlet line for receiving brewing water into the brewing chamber; a heating device for heating of the water supplied to the brewing chamber; a pump configured to pump the water from the source to the brewing chamber; and a control device to activate and deactivate the functional components for preparing the selected beverage; wherein the control device is configured to activate the pump at a rate of flow from a selection of different rates of flow for a subsequent beverage preparation.

One advantage attainable with the invention consists in that the beverages preset on the device or controller can be varied or adjusted in a nearly unlimited manner with respect to the brewing process. To do so, the rate of flow, which is a significant parameter for the beverage to be prepared, is manipulated or is optimally adjusted for the types of bean used.

In order to achieve these advantages in a simple manner, the control device is configured to activate the pump such that a predetermined rate of flow is set from a selection of different rates of flow. This means that the pump power in ml/min is set by the control device, that is, the power can be increased or decreased, depending on requirements. The requirement, which results in adjusting of the pump power or rate of flow is determined primarily by the beverage itself, that is, standard coffee, espresso, cappuccino, americano or other coffee specialties. As additional criteria, the coffee beans themselves, the grinding fineness and the taste profile, such as, for example, bitter, acid, balanced, come into consideration.

In one variation, the rate of flow can be selected in a range from 0.5 ml/s up to 8 ml/s. The choice preferably takes place here in steps, but can also proceed in very small increments and thus on a quasi-continuous basis. The rate of flow determined or selected based on the inputs is maintained during the entire brewing process and/or is retained as a desired-value for the control unit. In a somewhat simpler embodiment of the invention, the adjustable range for the rate of flow of the pump is 1 ml/s up to 8 ml/s.

In another variation, the control device is configured and programmed to adjust the rate of flow depending on taste properties. With these data that relate to the desired resulting taste, the optimum or predetermined rate of flow is set for the selected taste outcome.

Overall the control device is configured to adjust the rate of flow as a function of the predetermined quantity of water for the selected beverage in order to always retain the default contact time for an optimum brewing result. This result is in turn dependent on the types of coffee, which also includes the degree of roasting, and depends on the grinding fineness. The optimal contact time for the types of coffee used and the grinding fineness falls in a range from 10 seconds up to 2 minutes, wherein by the precisely adjusted rate of flow the respective optimum contact time or brewing time is satisfied, optionally with tolerance range of +−2 seconds. In the case of a beverage with a large amount of water, for example, a standard coffee, approximately 150 ml is pumped at 7.5 ml/s, thus pumped for a time of 20 seconds through the brewing chamber with the coffee powder held therein. In the case of an espresso, however, only 25 ml to 30 ml of water is pumped during the predetermined time through the coffee powder held in the brewing chamber, so that a rate of flow of 1.3 to 1.8 ml/s is set for this beverage.

In one embodiment of the device for preparing hot beverages with a grinding mill for grinding of coffee beans in order to supply the coffee powder to the brewing chamber, the control unit is configured to adjust the rate of flow as a function of the grinding fineness. In this case, the desired taste outcome can also be taken into account, as stated above. In the case of finely ground beans, the rate of flow is preferably increased, and for coarse ground beans, the rate of flow is reduced, for example, in order to release the minimum of bitter substances from the coffee powder. Overall the rate of flow is adjusted so that the complete fill quantity for the selected beverage is obtained in the contact time provided for the coffee powder used for the beverage, for example, a contact time is provided in the range from 15 to 30 seconds, preferably in the range from 18 seconds to 22 seconds.

In one additional variation, the control device is configured to adjust the rate of flow depending on the type of coffee. The type of coffee is thus made known to the control device, for example, using operating device. Alternatively, it is possible to report the type of coffee to an external device after a database query, in order then to obtain as a reply the adjusted rate of flow for the corresponding device for preparing hot beverages. Thus the coffee types with associated parameters need not be saved in the device control unit.

Then the user has to input the value on the rate of flow or brewing time received from the database into the operating device; alternatively, it is possible to transfer the obtained value directly from the external device to the control unit, preferably using a standardized transmission unit such as WLAN, Bluetooth or NFC. In one preferred embodiment, only the contact time or the brewing time is saved as a parameter in the database and is transmitted to the control unit according to the beverage selected. Then the control unit adjusts the rate of flow for the pump so that the contact time is maintained for the quantity of water to be pumped.

In a further preferred embodiment, the device for preparing hot beverages comprises an operation and display apparatus, which provides the inputs for user selection of the beverage to be prepared, for the taste properties, grinding fineness, types of coffee, and/or volume of water, wherein the operation and display apparatus is connected to the control device for transmission of the mentioned information. Based on these inputs, the rate of flow is based on a plurality of evaluation indices, wherein each evaluation index is intended for one or more of the following properties: taste profile; grinding fineness; type of coffee; and quantity of water.

Thus, several factors in combination are brought in to establish the rate of flow, so that an optimum taste outcome as desired by the user is obtained, as is possible for the particular type of bean.

In an expedient embodiment, the control device comprises tables, mathematical models or a calculation formula in order to produce the particular evaluation index and the resulting rate of flow based on the input information. This means that the individual indices are saved as a characteristic curve in the memory of the control unit, wherein due to the forming of an average value or of a sum, the total index is generated as a default or for adjusting of the rate of flow. All embodiments have in common that the establishing of the rate of flow occurs before the brewing step. This ensures that for the brewing, the optimum contact time is attained very accurately, as was already explained above, to obtain the best taste result.

In another embodiment of the refinement, the control unit comprises a data transmission unit for sending of the input information to a remote data processing unit and for receiving of evaluation indices or of an already calculated total index, wherein the control unit is configured to adjust the pump power or rate of flow corresponding to the received evaluation index or total index to adjust the beverage preparation accordingly. Thus, the means for evaluating of the input information is outsourced to an external server or cloud, so that the control unit or the memory of the control unit need not be burdened with the additional data.

Furthermore, the invention relates to a system comprising a device for preparing hot beverages, as discussed above, and a data processing device, wherein the control unit comprises a data transmission unit for sending of the input information to a remote data processing unit and for receiving of evaluation indices and/or of a total index, wherein the data processing unit is configured to generate an evaluation index or a total index based on the received input information, and to send the index to the control device and wherein the control device is configured accordingly to adjust the pump power and/or the rate of flow for the subsequent preparation of beverage based on the received evaluation index or total index. Thus, a large proportion of the saved data is moved out from the control unit. Also, any changes or additions to the data set are easy to perform because they have to be made on one device, namely the external data server.

In one preferred refinement, the system comprises an external device with an operating and display apparatus for preparing of inputs for the taste profile, grinding fineness, types of coffee and or quantity of water, wherein the external device comprises a data transmission unit for sending of the input information to a remote data processing unit and for receiving of evaluation indices or of a total index, wherein the remote data processing unit is configured, based on the received input information, to generate an evaluation index or a total index and to send this index to the external device, and wherein the control device includes an interface for receiving of the evaluation indices or of the evaluation index from the external device for adjusting of the pump power and/or of the rate of flow, respectively. In this case, as external controller a smartphone or tablet PC can be used, wherein the operating sequences can be conveniently undertaken at the external device, in order to transmit all parameters already generated in the external device, as needed before the brewing. In the system the device for preparing hot beverages requires no or only a very Spartan operating and display apparatus.

In a variant of the system, the external data processing unit comprises a table, mathematic model or a calculation formula in order to produce the evaluation index based on the input information.

One example of the invention is depicted schematically in the Figures and is explained in greater detail below. The drawings are provided herewith for purely illustrative purposes and are not intended to limit the scope of the present invention.

DETAILED DESCRIPTION OF THE DRAWINGS

Figure 1:
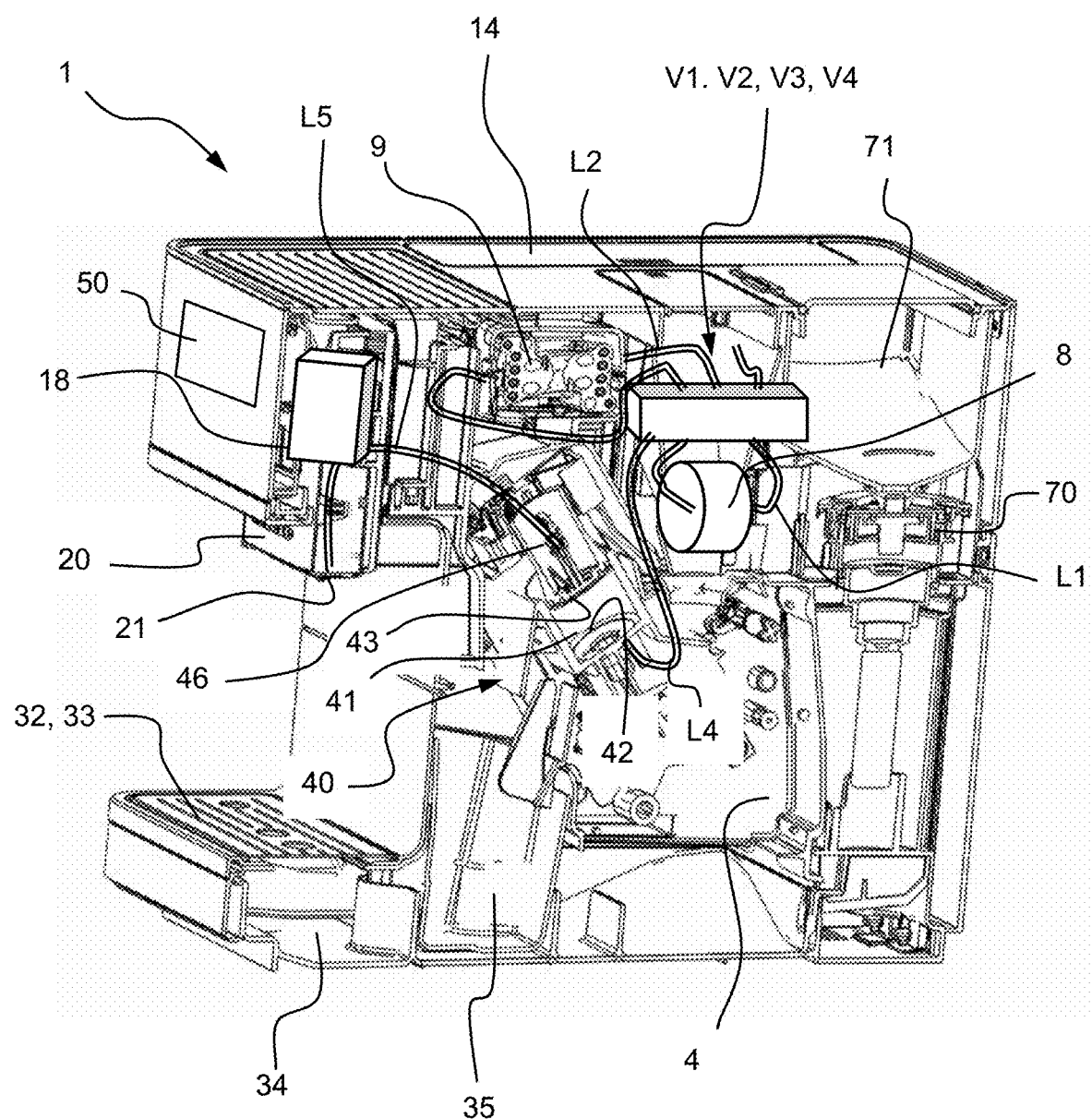
FIG. 1: shows a device for preparing hot beverages in a partially cross-sectional representation.

FIG. 1 shows the example of a device for preparing hot beverages 1 configured as a standard unit, with all relevant components for the preparation of a hot beverage. The beverage preparer 1 comprises inter alia, a housing 11, with the supply container 71 for coffee beans located therein and with grinding unit 70 with motor, arranged underneath, the water tank 14 and if desired, the flow control system 2. In the front region of the device for preparing hot beverages 1 there is a height-adjustable outlet 20, in which a plurality of sampling devices (here: outlet nozzles 21, 22) are accommodated. Sampling device 22 in the present case pertains to a steam nozzle for release of hot water vapor or hot water, for example, for diluting of a finished coffee or for preparing of a tea beverage. Sampling device 21 represents an outlet line or dosing nozzle 21 for the dispensing of coffee beverages. A brewing unit 40 with a brewing chamber 41 in the interior of the device 1 is used for preparing of the beverage, wherein the coffee powder is introduced into the brewing chamber 41 and is subsequently flushed with hot water, so that the finished coffee beverage is dispensed to the outlet line and through the dispensing nozzle 21. In this design the dispensing nozzles 21, 22 are height-adjustable so that they can be adapted in height to a drinking vessel placed upon the placement surface 33, without any spraying of the beverage occurring upon dispensing. A droplet plate 32 equipped with openings and slots forms the upper termination of the placement surface 33 in order to divert residual liquid into a collection dish 34 provided underneath the droplet plate 32. Furthermore, the device for preparing hot beverages 1 includes a grounds container 35, in which the consumed material, such as the compressed coffee "cake" can be discarded after completion of beverage preparation. The device 1 further comprises a control unit 18 configured to control the individual functional assemblies, such as the pumps 8, valves V1 to V4 and heating apparatus 9 and grinding mill 70, when used, as are each necessary for preparation of the selected beverage. The control unit 18 in this embodiment, which is configured as a microcontroller μC with an associated memory MEM (FIG. 2), is further configured to control the valves V1, V2 of the flow control system 2 so that the hot water is pumped through the brewing chamber 41. The operating and display apparatus 50 is arranged on the outside, at the front wall of the housing 11. In this example it is configured with a touch panel and a display or as a touch screen to enable inputs with respect to the beverage selection and additional settings relating to water quantity, taste intensity or type of bean. The operating and display apparatus 50 is connected to the control unit 18 and/or to the microprocessor μC for the exchange of data (FIG. 2).

Figure 2:
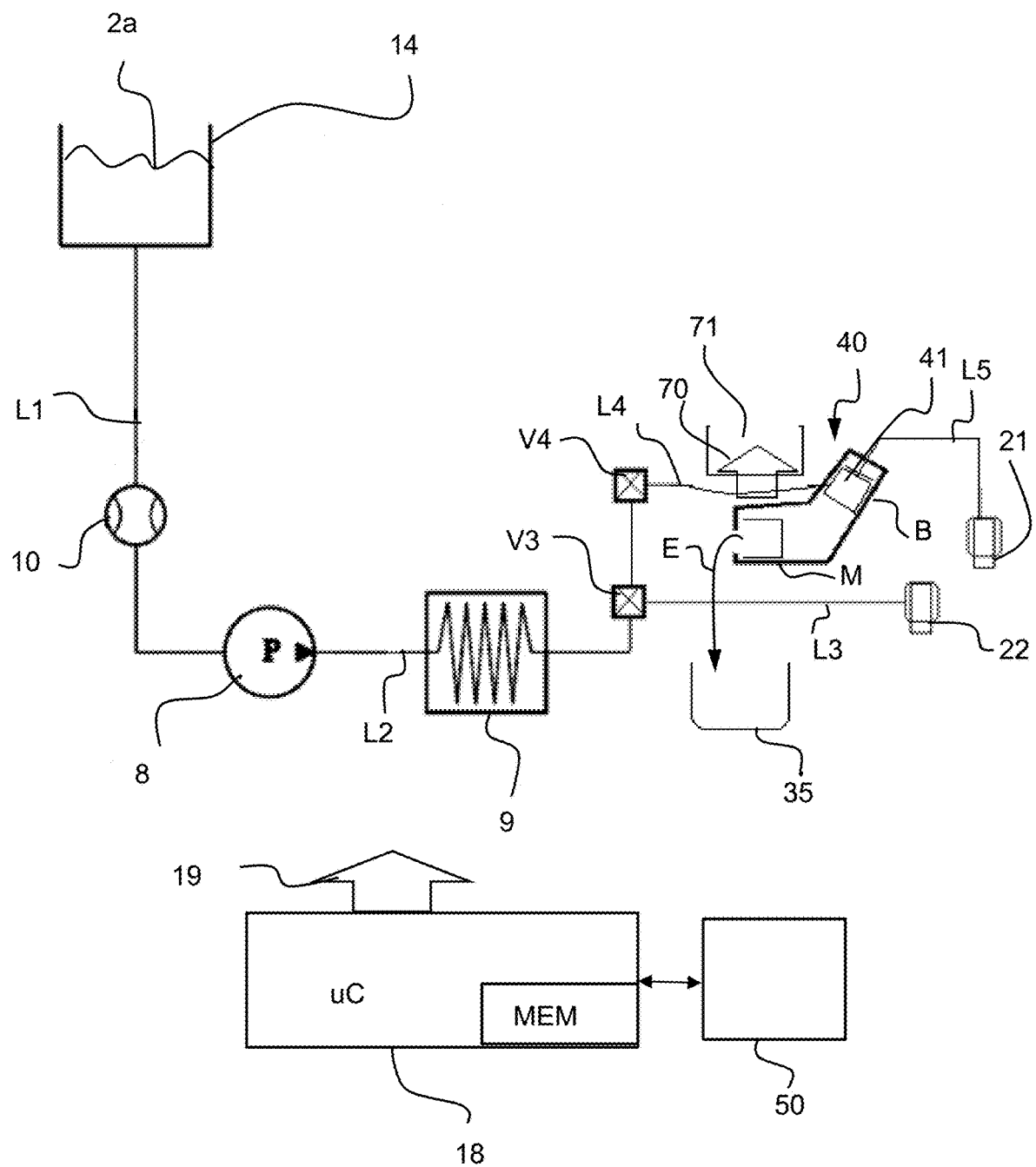
FIG. 2: shows a simplified circuit diagram of the flow control system.

FIG. 2 shows a simplified circuit diagram of a flow control system 2 inside an automated beverage machine 1. The flow control system 2 is supplied with fresh water from a water source 14, in this example, a water tank. The flow control system 2 in this regard comprises line segments and components that are used for preparation of beverages. A pump 8 is used to produce the flow within the flow control system 2 and to provide for the necessary pressure build-up. In addition, the portion of the flow control system 2 used for preparation of beverages includes a heating device 9 for heating of the water 2a and also several sampling devices 21, 22 plus line segments L1, L2, L3, L4 to connect the individual components together, wherein the steam nozzle 22 is provided for dispensing of steam and for dispensing of hot water and/or the coffee nozzle 21 for dispensing of the prepared coffee beverage or tea beverage, depending on the powder or substrate placed into the brewing chamber 41. The multi-path valves V3 and V4 are used for selective control of the sampling devices 21, 22. These valves are inlet-connected to the sampling devices 21 and/or the brewing chamber 41 in the direction of flow. In addition, the flow line system 2 can include a metering device for measuring the volume flow; this device is denoted as a flow meter 10 for determining a precise quantity of fresh water that is required for preparation of a beverage. In addition, the number of prepared beverages can also be determined with a metering device 10 of this kind.

The control unit 18 with a microcontroller μC and a memory unit MEM is used for preparation of the beverage, wherein the activation of the heating unit 9, the valves V1, V2, V3 and V4, and also of the pump 8, the brewing chamber 40 and other components, if necessary, such as a grinding mill 70 proceeds using corresponding signal connections 31. The signal connection 19 to the motor of the pump 8 and to the other controlled components is roughly sketched in FIG. 2, and the control of the pump 8 occurs preferably in such a manner that different pumping powers can be set. The control unit 18 in a preferred embodiment is furthermore programmed to activate or to drive the servomotor 52 (FIG. 3, 4) of the valve apparatus 46 for adjusting of the brewing pressure in the brewing chamber 41 in order to adjust different pressures for opening of the valve 46

Figure 3:
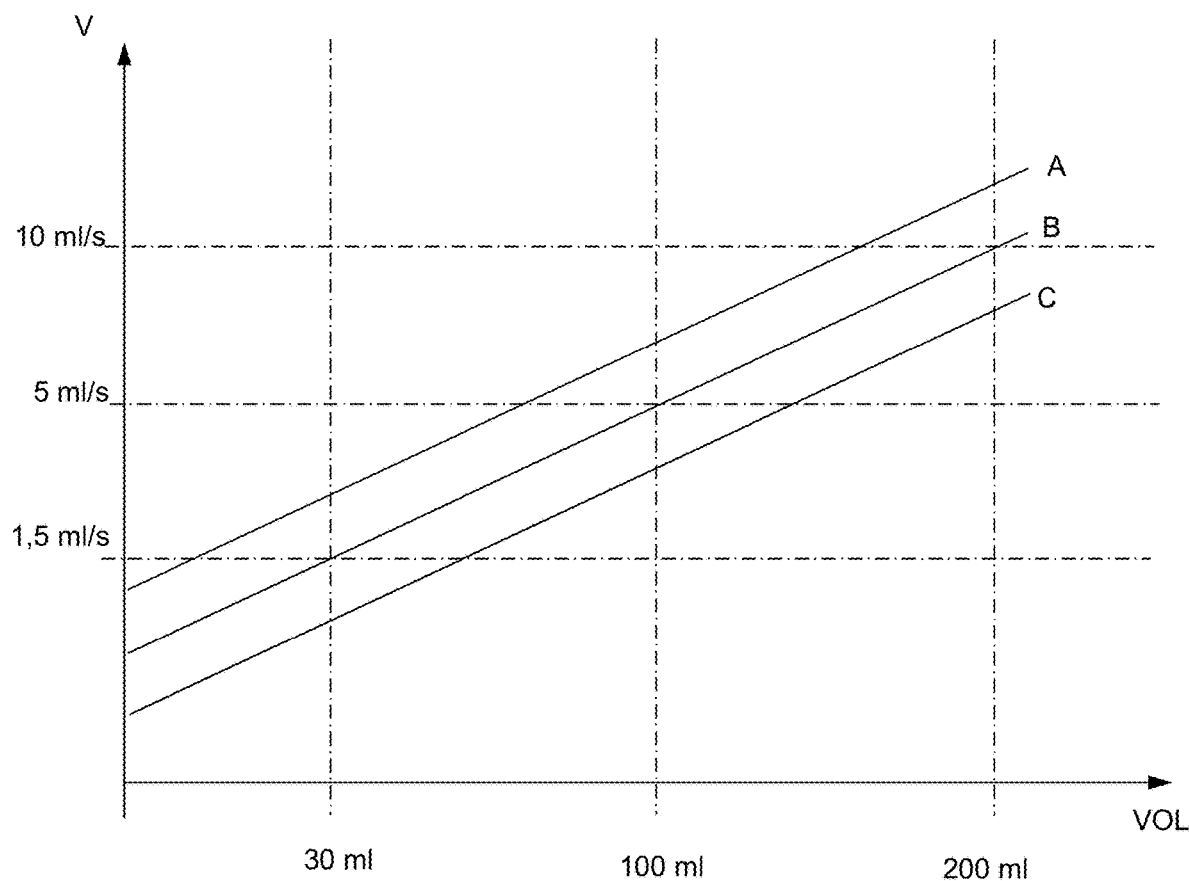
FIG. 3: shows a diagram to represent the rate of flow.

The function of the controller for the pump is sketched in FIG. 3 based on a diagram. The desired quantity of water to be brewed or dispensed is plotted on the X-axis, and the rate of flow to be adjusted is plotted on the Y-axis. A contact time of 20 seconds is set on characteristic curve B. For a water quantity of 30 ml a flow rate of 1.5 ml/s is set so that after 20 seconds a volume of 30 ml of beverage is obtained. This may apply for an espresso. For a water quantity of 100 ml, for example for a small cup of coffee, a flow rate or flow speed of 5 ml/s is selected. For a large coffee with 200 ml of water, a flow rate of 10 ml/s is selected. A contact time of 20 seconds is ensured for all quantities of water.

The characteristic line C ensures a contact time of 25 seconds for all selected water quantities. For the selected quantity of 30 ml of water, a rate of flow of 1.2 ml/s is set. This can be adjusted accordingly when the selected taste parameter is set, for example, to bitter. Furthermore, this setting can be the optimum for certain types of coffee that release the desired aromas only later in the brewing process. For a given quantity of 100 ml of water, a rate of flow $\dot{V}$ of 4 ml/s is adjusted, for 200 ml a rate of flow of 8 ml/s is adjusted in order to maintain a contact time or brewing time of 25 seconds under all conditions.

The characteristic curve A effects a contact time of 17 seconds for all selected water quantities VOL. For the selected quantity of VOL=30 ml of water, a rate of flow of 1.8 ml/s is set. This can be adjusted accordingly when the selected taste parameter is set, for example, to fruity, in order to release solely the acidic substances. Furthermore, this setting can be the optimum for certain types of coffee that release the desired aromas very early in the brewing process. For a given quantity of 100 ml of water, a rate of flow $\dot{V}$ of 6 ml/s is set, for 200 ml a rate of flow of 12 ml/s is set in order to maintain a contact time or brewing time of 17 seconds under all conditions. The parallel shift in the characteristic curves takes place as a function of the type of coffee and the desired taste profile, such as fruity or bitter. Furthermore, the grinding fineness can have an effect on the contact time such that with a finer grind the contact time can be reduced, and for a coarser grind, the contact time can be increased.

Figure 4:
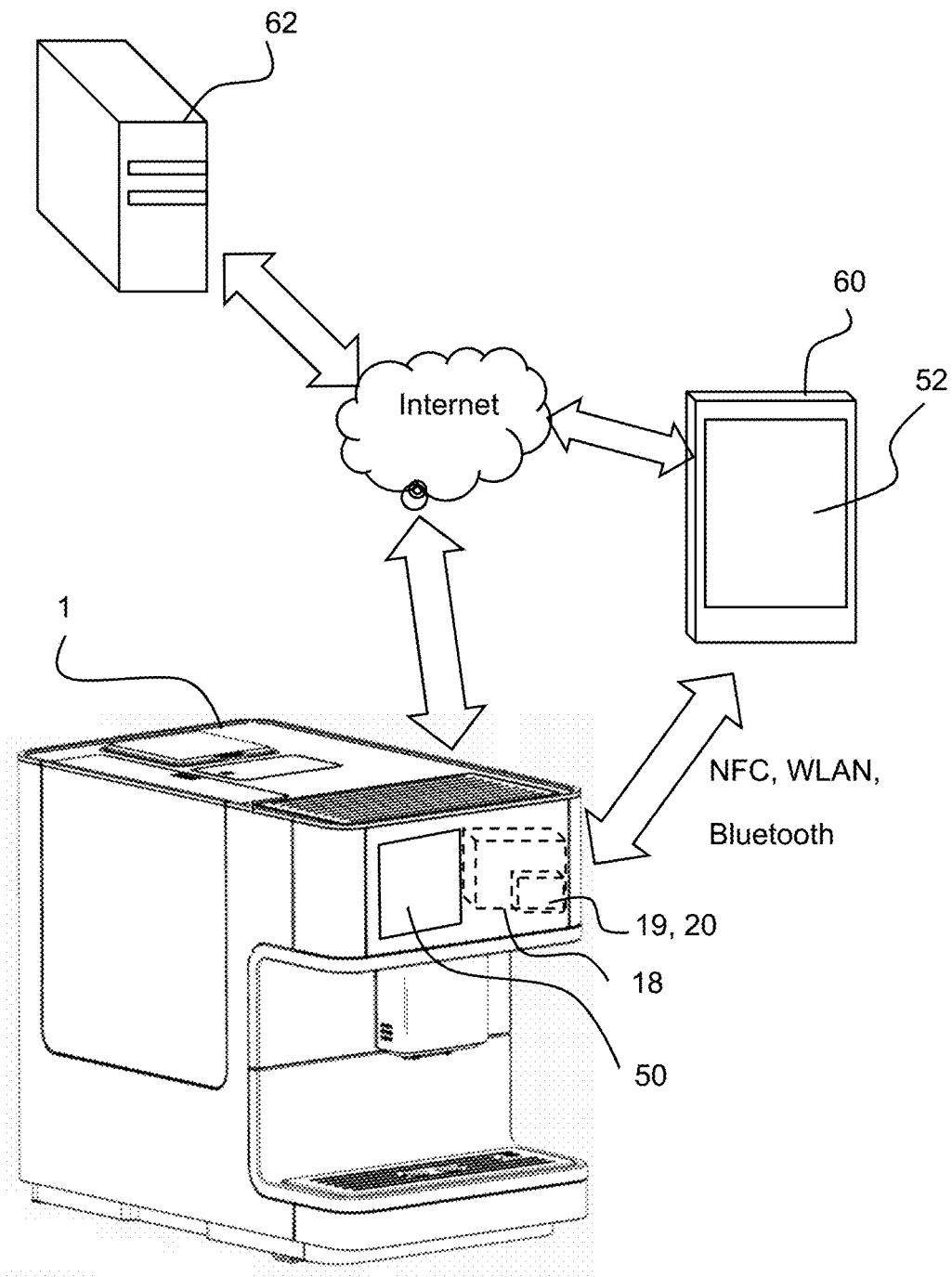
FIG. 4: shows a system with a beverage preparer, an external device, and a remote data processing unit.

FIG. 4 shows a schematic of a system comprising a device for preparing hot beverages 1 with a control unit 18, an external operating device 60 and a remote data processing unit or server 62. With the external device 60, such as a smartphone, inputs can be sent via the touch screen 52 for operating of the beverage preparer 1. Furthermore, parameters can be set that pertain to the type of coffee, the taste profile, the grinding fineness and/or the quantity VOL of the water pumped for the brewing process. In one preferred design this information is sent via network, internet or mobile radio to the remote server 62. The server then calculates a value $\dot{V}$ for a rate of flow sent to the external device 60. In turn, the external device 60 is in communication with the control unit 18 of the beverage preparer 1 in order to transfer the value $\dot{V}$ received from the remote server 62 to the interface 19 of the control unit 18. The control unit 18 activates the pump 8 for the brewing process to be subsequently started using the received rate of flow $\dot{V}$.

In another or in an additional design, the parameters are input using the operating unit 50 located on or in the device 1. This unit 50 or the control unit 18 sends this input information via the interface 20 to a remote server 62 without the assistance of an external operating device 60. The external server 62 calculates an optimum rate of flow V̇ for the obtained parameters, which is sent to the control unit 18 as a value or index. The control unit 18 activates the pump 8 for the brewing process to be subsequently started using the received rate of flow V̇.

Standard means are used for data transmission to and from the remote server 62, such as for example, internet, mobile radio standards, WAN. Standard transmission units, such as Bluetooth, NFC, WLAN or wire transmission unit are used for a short-distance transmission between external operating device 60 and beverage preparer 1.

Overall, with the described beverage preparer it is assured that an extraction rate of about 20% is set, so that only the so-called "good" taste substances are extracted from the coffee powder. This is also the intent of recognized baristas so that the described beverage preparer offers the optimum taste experience for a plurality of coffee types, brewing profiles and roastings.

While the above description constitutes the preferred embodiments of the present invention, it will be appreciated that the invention is susceptible to modification, variation and change without departing from the proper scope and fair meaning of the accompanying claims.

The invention claimed is:

1. A device for preparing hot beverages (1) with a flow control system (2) comprising:
   a water source (14);
   a brewing unit (40) including a brewing chamber (41) to hold brewing material and an inlet line (L4) for receiving brewing water into the brewing chamber (41);
   a heating device (9) for heating of the water supplied to the brewing chamber (41);
   a pump (9) configured to pump the water from the source (14) to the brewing chamber (41);
   a control device (18) to activate and deactivate the functional components for preparing the selected beverage;
   an operation and display apparatus (50) that provides the inputs for user selection of the beverage to be prepared, for the taste properties, grinding fineness, type of coffee, and/or volume of water, wherein the operation and display apparatus (50) is connected to the control device (18) for transmission of the mentioned information, wherein the control device (18) is configured to specify the rate of flow (V̇) based on a plurality of evaluation indices or a total index, wherein each of the plurality of evaluation indices or the total index is associated with one or more of the following properties,
   a taste profile;
   a grinding fineness;
   a selected type of coffee; and
   a quantity of water;
   wherein the control device (18) is configured to activate the pump (9) at a rate of flow from a selection of different rates of flow (V̇) for a subsequent beverage preparation; and
   wherein the control device (18) comprises a data transmission unit (19) for sending input information to a remote data processing unit (62) and for receiving evaluation indices or an already calculated total index, wherein the control device (18) is configured accordingly to adjust the pump power or rate of flow (V̇) for the subsequent preparation of beverage corresponding to the received evaluation index or total index.

2. The device for preparing hot beverages according to claim 1, wherein the selection of different rates of flow (V̇) is in the range from 0.5 ml/s up to 8 ml/s.

3. The device for preparing hot beverages according to claim 1, wherein the control device (18) is configured and programmed to adjust the rate of flow (V̇) depending on a taste profile.

4. The device for preparing hot beverages according to claim 1, wherein the control device (18) is configured and programmed to adjust the rate of flow (V̇) depending on a predetermined quantity of water for the selected beverage.

5. The device for preparing hot beverages according to claim 1, further comprising a grinder (70) for grinding of coffee beans in order to supply coffee powder to the brewing chamber (41),
   wherein the rate of flow (V̇) is dependent on a grinding fineness.

6. The device for preparing hot beverages according to claim 1, wherein the rate of flow (V̇) is dependent on a selected type of coffee.

7. The device for preparing hot beverages according to claim 1, wherein the control device (18) stores tables, mathematical models, or a calculation formula in a non-transient memory and applies the tables, mathematical models, or a calculation formula to produce the plurality of evaluation indices or the total index, and the resulting rate of flow (V̇) based on the input information.

8. A system for preparing hot beverages, comprising a device according to claim 1 and the data processing unit (62), wherein the data processing unit (62) is configured to generate the evaluation indices or the total index based on the received input information, and to send the evaluation indices or the total index to the data transmission unit of the control device (18) and wherein the control device (18) is configured accordingly to adjust at least one of the pump power and the rate of flow (V̇) for a subsequent preparation of a selected beverage based on the received evaluation index or total index.

9. The system according to claim 8, further comprising:
   an external device (60) with an operating and display apparatus (52) for presenting input options for selecting at least one of the following parameters: a taste profile; a grinding fineness, a type of coffee, and a volume of water;
   wherein the external device (60) comprises a further data transmission unit for sending input information representing selected input options to a remote data processing unit (62) and for receiving the evaluation indices or the total index, wherein the control device (18) includes an interface (19) for receiving of the evaluation indices or of the total index from the external device (60), to adjust the pump.

10. The system according to claim 9, further comprising the remote data processing unit (62), wherein the remote data processing unit (62) is configured to generate the evaluation indices or the total index based on the received input information and to send the evaluation indices or the total index to the control device (60).

11. The system according to claim 8, wherein the external data processing unit (62) comprises a table, mathematical model or a calculation formula in order to produce the evaluation index based on the input information for the rate of flow (V̇) to be adjusted.

* * * * *